United States Patent
Dybkjær et al.

(10) Patent No.: US 9,828,246 B2
(45) Date of Patent: Nov. 28, 2017

(54) PROCESS FOR THE PRODUCTION OF SYNTHESIS GAS

(71) Applicant: Haldor Topsøe A/S, Kgs. Lyngby (DK)

(72) Inventors: Ib Dybkjær, Copenhagen (DK); Kim Aasberg-Petersen, Allerød (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/120,341

(22) PCT Filed: Feb. 26, 2015

(86) PCT No.: PCT/EP2015/053968
§ 371 (c)(1),
(2) Date: Aug. 19, 2016

(87) PCT Pub. No.: WO2015/128395
PCT Pub. Date: Sep. 3, 2015

(65) Prior Publication Data
US 2017/0073227 A1    Mar. 16, 2017

(30) Foreign Application Priority Data
Feb. 28, 2014   (DK) ................................ 2014 70095

(51) Int. Cl.
*C01B 3/48* (2006.01)
*C01B 3/38* (2006.01)
*C10G 2/00* (2006.01)

(52) U.S. Cl.
CPC ............... *C01B 3/48* (2013.01); *C01B 3/382* (2013.01); *C10G 2/30* (2013.01); *C01B 2203/0233* (2013.01); *C01B 2203/0244* (2013.01); *C01B 2203/0261* (2013.01); *C01B 2203/0283* (2013.01); *C01B 2203/04* (2013.01); *C01B 2203/047* (2013.01); *C01B 2203/062* (2013.01); *C01B 2203/0844* (2013.01); *C01B 2203/1205* (2013.01); *C01B 2203/1235* (2013.01); *C01B 2203/1258* (2013.01); *C01B 2203/1264* (2013.01); *C01B 2203/141* (2013.01);
(Continued)

(58) Field of Classification Search
CPC ... C01B 3/48; C01B 3/382; C01B 2203/0244; C01B 2203/0261; C01B 2203/0233; C01B 2203/0283; C01B 2203/062; C01B 2203/1264; C01B 2203/141; C01B 2203/148; C10G 2/30
See application file for complete search history.

(56) References Cited

U.S. PATENT DOCUMENTS 5,122,299 A   6/1992   LeBlanc
6,085,512 A   7/2000   Agee et al.
(Continued)

FOREIGN PATENT DOCUMENTS

EP   0 382 442 A2   8/1990
EP   0 522 744 A2   1/1993
(Continued)

*Primary Examiner* — Jafar Parsa
(74) *Attorney, Agent, or Firm* — Blank Rome LLP

(57) ABSTRACT

The invention relates to a process for the production of liquid hydrocarbons by Fischer-Tropsch synthesis in which the reforming section of the plant comprises a process line comprising autothermal reforming (ATR) (5) or catalytic partial oxidation (CPO), and a separate process line comprising steam methane reforming (SMR) (8).

11 Claims, 3 Drawing Sheets

(52) U.S. Cl.
CPC .. *C01B 2203/142* (2013.01); *C01B 2203/148* (2013.01); *C01B 2203/1671* (2013.01)

(56) References Cited

U.S. PATENT DOCUMENTS

| | | | |
|---|---|---|---|
| 2004/0063798 A1* | 4/2004 | Erikstrup | C01B 3/382 518/704 |
| 2004/0182002 A1 | 9/2004 | Malhotra et al. | |

FOREIGN PATENT DOCUMENTS

| | | |
|---|---|---|
| EP | 0 983 963 A2 | 3/2000 |
| EP | 1 403 216 A1 | 3/2004 |
| GB | 944059 A | 12/1963 |
| GB | 2 407 819 A | 5/2005 |
| GB | 2 409 460 A | 6/2005 |
| WO | WO 93/15999 A1 | 8/1993 |
| WO | WO 2013/033812 A1 | 3/2013 |

* cited by examiner

PROCESS FOR THE PRODUCTION OF SYNTHESIS GAS

FIELD OF THE INVENTION

The present invention relates to a process for production of synthesis gas used for the production of liquid hydrocarbons, especially diesel by Fischer-Tropsch synthesis. The invention relates in particular to a process for the production of liquid hydrocarbons in which a portion of the hydrocarbon feed is passed through a first reforming process line comprising autothermal reforming (ATR), while the remaining portion of the hydrocarbon feed is passed through a second reforming process line comprising steam methane reforming. Tail gas from downstream Fischer-Tropsch synthesis is recycled to the reforming section, in particular to the first reforming process line.

BACKGROUND OF THE INVENTION

A typical plant for production of synthetic hydrocarbons by Fischer-Tropsch synthesis such as diesel consists of the following main process units: (a) air separation, (b) synthesis gas preparation via ATR, (c) Fischer-Tropsch synthesis of a raw product of hydrocarbons such as wax and liquid, (d) upgrading comprising hydrocracking and often other refinery steps. More specifically, conventional plants include a reforming section for producing synthesis gas, a downstream Fischer-Tropsch (FT) synthesis section and an upgrading section. In the reforming section hydrocarbon feedstock, normally natural gas is normally pre-reformed, mixed with part of the off gas (tail gas) from the downstream FT synthesis section, and then passed through an autothermal reformer (ATR) to produce a synthesis gas. An oxygen containing stream is also added to the ATR. The synthesis gas is cooled, condensate is removed and the thus dehydrated synthesis gas is converted to synthetic hydrocarbons via Fischer-Tropsch synthesis. In the FT-synthesis section hydrogen and carbon monoxide react to produce a range of hydrocarbons (including methane, light and heavier paraffins and olefins) and water as well as various by-products for example in the form of oxygenates. An off-gas is also produced.

This off-gas from FT-synthesis is often in the form of a so-called tail gas comprising unreacted hydrogen and carbon monoxide and light hydrocarbons (typically with five or less carbon atoms) including olefins. The tail gas comprises often also carbon dioxide and other typically inert compounds such as nitrogen and argon. The synthetic hydrocarbons may be further upgraded typically resulting in end products such as diesel, naphtha, and LPG. LPG is a mixture of hydrocarbons comprising predominately propane and butane(s).

The above design is typical for a plant in which the main required product is diesel and in which the hydrocarbon synthesis is performed using a so-called low temperature Fischer-Tropsch synthesis with a cobalt based catalyst. However, a similar design may in some cases be used when other synthetic hydrocarbons are the main end product and/or if other types of FT-synthesis catalysts or technologies are employed.

An alternative to autothermal reforming is to produce the synthesis gas by steam reforming without oxygen. Steam reforming of hydrocarbons proceeds according to the following main reaction (for methane):

$$CH_4 + H_2O \leftrightarrow CO + 3H_2 \quad (1)$$

Similar reactions take place for other hydrocarbons. Normally the following reaction also proceeds on catalysts for steam reforming:

$$CO + H_2O \leftrightarrow CO_2 + H_2 \quad (2)$$

Steam reforming is highly endothermic and requires high temperatures typically above 800° C. in the reactor outlet to give acceptable conversions of the methane in the feed.

Main final products of Fischer-Tropsch synthesis are among others diesel and naphtha. The value of the naphtha is lower than the diesel. It is therefore known to recycle naphtha to the reforming section of the plant. WO-A-2013/033812 discloses a process (FIG. 5 herein) in which a hydrocarbon feedstock in the form of a natural gas stream after being desulfurized and pre-reformed is divided in two reforming process lines. One reforming process line passes through a steam methane reformer (SMR) and the other through an autothermal reformer (ATR). The thus reformed gases are combined into a single synthesis gas stream and then converted into diesel and naphtha via Fischer-Tropsch synthesis. Naphtha is recycled to the reforming section as well as part of the tail gas produced during the synthesis. This citation is silent about how much of the hydrogen and carbon monoxide of the combined synthesis gas is produced by SMR. In addition, the recycle of naphtha may require a higher steam-to-carbon molar ratio to avoid carbon formation in the pre-reformer or steam reformer and/or soot formation in the ATR. Higher steam-to-carbon molar ratios increase the capital expenses of the plant as more water has to be carried in the process.

Similarly, WO-A-2006/117499 (in particular FIG. 3 herein) discloses also a process in which pre-reformed gas is split into two lines. One line is passed through an ATR and the other parallel line through an SMR. The reformed gases from both lines are combined and are used in a plurality of downstream processes such as methanol, ammonia and Fischer-Trospch synthesis. Tail gas from Fischer-Trospch synthesis is recycled to the ATR, but not to the SMR. It is stated that the tail gas recycle is adjusted to meet the requirements of the downstream processes. This citation is also silent about how much of the hydrogen and carbon monoxide of the combined synthesis gas is produced by SMR.

In a plant for producing methanol, the desired stoichiometry of the synthesis gas to be sent to the methanol section is often expressed by the so-called module, M, where $M = (X(H_2) - X(CO_2))/(X(CO) + X(CO_2))$; X is the mole fraction of the respective component. An optimal value of M is often stated to be 2 or slightly above, i.e. 2.0-2.10.

A stand-alone ATR unit (optionally with an upstream adiabatic pre-reformer) produces a synthesis gas with an M-value typically in the range 1.8.1-9 depending upon the operating conditions and the feedstock composition. In order to obtain a better module various methods may be used. These include recycle or import of hydrogen and removal of carbon dioxide. It has also been described in the patent literature, e.g. WO-A-2013/013895 to include a parallel SMR line to meet the desired value of M of about 2. An SMR produces a gas with an M value higher than 2. Hence, it is known to adjust the ratio of the synthesis gas produced by the ATR line and the SMR line to meet the desired value of M of about 2 in the final synthesis gas mixed from the two lines to be sent to a methanol unit. A similar citation is US-A-2007/004809. Again, this citation is silent about how much of the hydrogen and carbon monoxide of the combined synthesis gas is produced by SMR.

Conventional plants currently in operation for production of diesel via Fischer-Tropsch synthesis comprise a single line in which pre-reformed gas is passed through an ATR with Fischer-Tropsch tail gas and an oxygen containing gas. The amount of tail gas is adjusted to produce a synthesis gas with the required $H_2/CO$ molar ratio which is typically about 2. When this method of controlling the ratio between $H_2$ and CO is used, a significant part of the total amount of tail gas may not be recycled, because this would produce a synthesis gas with too low ratio of $H_2$ to CO. The part of tail gas which is not recycled may be used as fuel for process heaters and other purposes in the process. In case excess tail gas is available beyond these purposes, this represents a loss of overall efficiency.

It is well known that using a SMR instead of the ATR in a Fischer-Tropsch process results in a lower overall plant efficiency. This is i.a. due to external heat requirements for the SMR and the fact that ATR produces a synthesis gas more suitable for a Fischer-Tropsch synthesis stage than SMR. For example, for Fischer-Tropsch units it is advantageous to conduct Fischer-Tropsch-synthesis with a low inert concentration. Specifically, for low temperature units with cobalt based catalyst, all components except carbon monoxide and hydrogen may be considered inert. SMR produces a gas with a significantly higher inert content than ATR. Hence, in FT-plants the desired synthesis gas stoichiometry not only needs to have a $H_2/CO$-molar ratio of about 2 but also a low inert level. Inerts include for example nitrogen, argon, methane, and often also carbon dioxide.

It is also well known that a non-catalytic partial oxidation unit (PDX) may operate in parallel with an SMR. This is however expected because the PDX unit produces a gas with $H_2/CO$ molar ratio below 2, while the SMR produces a gas with $H_2/CO$ molar ratio of well above 2 and in most cases higher than 3. Hence combining here the gases in order to obtain a synthesis gas with the desired $H_2/CO$ molar ratio of 2 for the purpose of downstream Fischer-Tropsch is straightforward.

It is an object of the present invention to provide a process for production of synthesis gas in a plant for production of diesel or other synthetic hydrocarbons with increased plant efficiency.

It is also an object of the present invention to provide a process for production of synthesis gas in a plant for production of diesel or other synthetic hydrocarbons with increased plant efficiency while at the same time being able to operate at low steam-to-carbon molar ratios in the ATR or pre-reforming stages.

These and other objects are solved by the present invention as recited in the appended claims.

SUMMARY OF THE INVENTION

In the present invention, ATR and SMR are operated in parallel at specific conditions. Accordingly, the present invention is a process for the production of synthesis gas comprising:
(a) passing a first hydrocarbon feedstock, a tail gas from a Fischer-Tropsch (FT) synthesis stage, and an oxidant gas to an autothermal reforming (ATR) stage or catalytic partial oxidation (CPO) stage to form a raw synthesis gas;
(b) passing a second hydrocarbon feedstock through a primary reforming stage in the form of steam methane reforming (SMR), heat exchange reforming (HER) or combination of both, to form a primary reformed gas;
(c) combining part or all of the primary reformed gas of step (b) with the raw synthesis gas of step (a) to form a synthesis gas; wherein in step (c) the ratio ($R_{SMR}$) defined as the volumetric flow rate of carbon monoxide and hydrogen in the primary reformed gas which is combined with said raw synthesis gas to the volumetric flow rate of the hydrogen and carbon monoxide in the synthesis gas is between 1 and 20%.

It is counterintuitive to operate an ATR and an SMR in parallel for the production of synthesis gas in a Fischer-Tropsch (FT) plant at the specific process conditions described above for at least two reasons:
1) An ATR (without recycle of tail gas from the FT-synthesis unit) produces a synthesis gas with an $H_2/CO$-ratio ($H_2/CO$ molar ratio) of normally 2.2-2.3 or above with natural gas and similar feeds. The actual value of $H_2/CO$-ratio depends upon the feed composition and selected operating conditions including the steam-to-carbon molar ratio. Recycle of the (inert containing) tail gas from the FT unit is required to reduce the $H_2/CO$-ratio to the desired value of about 2. An SMR produces a gas with an even higher $H_2/CO$-ratio of well above 2 and in most cases higher than 3. In other words, operating an SMR in parallel to an ATR in an FT plant will increase the $H_2/CO$-ratio (without tail gas recycle from the FT-unit) compared to a stand-alone ATR. The provision of SMR in parallel with the ATR will result in a synthesis gas with a $H_2/CO$-ratio much higher from the desired ratio of about 2. This means that a higher recycle of the inert containing tail gas is needed.
2) It is well known that using a SMR instead of the ATR in a Fischer-Tropsch process results in a lower overall plant efficiency. This is due among other reasons to external heat requirements for the SMR and the fact described above that ATR produces a synthesis gas more suitable for a Fischer-Tropsch synthesis stage than does SMR in terms of $H_2/CO$-ratio. Furthermore, as noted above low inert concentration is advantageous. Specifically, for low temperature Fischer-Tropsch units with cobalt based catalyst, all components except carbon monoxide and hydrogen may be considered inert. SMR produces a gas with a higher inert content than ATR.

Hence, it has now been found that producing part of the synthesis gas for FT-synthesis by an SMR in parallel to an ATR actually increases plant efficiency. This is further explained in the following. The term $R_{SMR}$ is used. $R_{SMR}$ means the amount of hydrogen and carbon monoxide produced by the SMR-line divided by the total amount of carbon monoxide and hydrogen in the synthesis gas to be sent to the FT-unit (FT-synthesis). More specifically, $R_{SMR}$ is defined as the volumetric flow rate of carbon monoxide and hydrogen in the primary reformed gas which is combined with said raw synthesis gas to the volumetric flow rate of the hydrogen and carbon monoxide in the synthesis gas. The total amount hydrogen and carbon monoxide in the synthesis gas to be sent to the FT-unit is the sum of the hydrogen and carbon monoxide produced by the SMR-line and the hydrogen and carbon monoxide produced by the ATR-line. The term "amount" in this context should be understood as volumetric flow rate, e.g kmol/hr. When $R_{SMR}$ is in the specific range 1-20%, preferably 3-15%, more preferably 5-10%, or 3-8%, the plant efficiency surprisingly increases. Outside this range, in particular above 20%, the expected decrease in plant efficiency as the contribution by the SMR-line increases is observed.

As used herein the term "plant efficiency" means: carbon in FT-product/carbon in hydrocarbon feedstock. The carbon in FT-product is the carbon in the produced diesel, naphtha, and LPG. The carbon in the hydrocarbon feedstock is carbon in hydrocarbons in the hydrocarbon feedstock and does not include CO or $CO_2$. The carbon content in tail gas is not part of the formula above. Hydrocarbon feedstock means the first and second hydrocarbon feedstock.

By the term "hydrocarbon feedstock" is meant a stream used in the process which comprises hydrocarbons. In the broadest sense, hydrocarbons are organic compounds comprising hydrogen and carbon. The hydrocarbons may be as simple as e.g. methane $CH_4$, and may comprise more complex molecules. Natural gas is a conventional feed having methane as its major constituent. Natural gas and desulfurized natural gas are examples of hydrocarbon feedstocks. Another example is a mixture of natural gas and LPG.

A reference case based on ATR only (all synthesis gas produced by an ATR line; $R_{SMR}=0$) results in a reference case plant efficiency. According to the present invention, using an SMR in parallel (increasing $R_{SMR}$ to above 0) results in higher plant efficiency. However, this is only up to a certain value of $R_{SMR}$. Increasing $R_{SMR}$ even further will decrease the plant efficiency.

In a particular embodiment, said first hydrocarbon feedstock and said second hydrocarbon feedstock are split from a single hydrocarbon feedstock and prior to split the single hydrocarbon feedstock is subjected to pre-reforming. This reduces the number of process steps, thereby reducing capital costs.

In a particular embodiment in connection with one or more of the above or below embodiments, naphtha formed or synthesised in the FT-synthesis stage is not added to the first hydrocarbon feedstock or the second hydrocarbon feedstock or to the single hydrocarbon feedstock. This enables operation at lower steam-to-carbon molar ratios in the process, particularly when operating with pre-reforming. Naphtha is a heavy hydrocarbon and as such its presence will require a higher steam-to-carbon molar ratio to avoid carbon formation in the pre-reformer or steam reformer and/or soot formation in the ATR.

In a particular embodiment in connection with one or more of the above or below embodiments, each individual stream in the form of first hydrocarbon feedstock, or second hydrocarbon feedstock, or both, is subjected to pre-reforming prior to passing through autothermal reforming stage or primary reforming stages. This enables pre-reforming of each stream at optimized conditions, i.e. with lowest amount of steam necessary.

In a particular embodiment in connection with one or more of the above and below embodiments, the process further comprises subjecting primary reformed gas to the sequential stages of water gas shifting, separating a hydrogen-rich stream in a separation means, and mixing all or a portion of the hydrogen-rich stream with the produced synthesis gas of step (c). The hydrogen is used for hydrotreating or hydrocracking of the products from the Fischer-Tropsch synthesis unit.

In another particular embodiment in connection with one or more of the above and below embodiments, the process further comprises subjecting primary reformed gas to the sequential stages of water gas shifting, separating a hydrogen-rich stream in a separation means, and mixing all or a portion of the hydrogen-rich stream with the raw synthesis gas of step (a). The hydrogen produced may also be used for hydrotreating or hydrocracking of the products from the Fischer-Tropsch synthesis unit.

In yet another embodiment in connection with one or more of the above or below embodiments, the process further comprises subjecting the primary reformed gas of step (b) to carbon dioxide removal. Preferably the carbon dioxide content in the primary reformed gas is reduced to 5 vol. % or lower, e.g. 1 vol % or lower.

Accordingly, the primary reformed gas which is combined with said raw synthesis gas may also be in the form of a gas which has been subjected to carbon dioxide removal, or water gas shift optionally together with hydrogen separation, or a combination of these.

The separation means is selected from a pressure swing adsorber (PSA), cryogenic-type adsorber and membrane-type adsorber, preferably PSA.

A hydrogen-rich stream means a stream with more than 75% vol % hydrogen or more than 90 vol % hydrogen, preferably more than 95 vol % hydrogen or most preferably more than 99 vol % hydrogen.

In yet another embodiment in connection with one or more of the above or below embodiments, the produced synthesis gas of step (c) has a molar ratio of hydrogen to carbon monoxide of 1.7-2.3, preferably 1.8-2.2.

In yet another embodiment in connection with one or more of the above and below embodiments, part of the tail gas from the Fischer-Tropsch stage is added to the second hydrocarbon feedstock of step (b).

The first or second hydrocarbon feedstock or single hydrocarbon feedstock prior to split may as described above be subjected to a step of pre-reforming, preferably adiabatic pre-reforming before being directed to a downstream reforming stage in the ATR-line or SMR-line. In the adiabatic pre-reformer most or all of the higher hydrocarbons (hydrocarbon compounds with 2 or more carbon atoms) are converted according to the following reactions:

$$C_nH_m + nH_2O \rightarrow (\tfrac{1}{2}m+n)H_2 + nCO \quad (1)$$

$$3H_2 + CO \leftrightarrow CH_4 + H_2O \quad (2)$$

$$CO + H_2O \leftrightarrow H_2 + CO_2 \quad (3)$$

Reactions (2) and (3) are normally close to equilibrium at the outlet of the pre-reformer.

Preferably, the pre-reforming stage is conducted adiabatically in a fixed bed of nickel catalyst. Thus, the adiabatic pre-reformer contains preferably a fixed bed of catalyst having nickel as the active constituent on a suitable carrier, such as $MgO/Al_2O_3$ or Mg—Al spinel.

The term "tail gas" as used herein means an off-gas from a Fischer-Tropsch synthesis unit comprising:
5-35 vol. % carbon monoxide (CO)
5-35 vol. % hydrogen ($H_2$)
5-35 vol. % carbon dioxide ($CO_2$)
More than 2 vol. % methane ($CH_4$)

The tail gas in many cases also comprises higher hydrocarbons including olefins, as well as argon and nitrogen.

As used herein the term "ATR-line" means the process line in which autothermal reforming is conducted, i.e. step (a), and may also include use of heat exchange reforming (HER) either in series with or parallel to the ATR. Accordingly, in another embodiment in connection with one or more of the above and below embodiments, in step (a) the autothermal reforming (ATR) stage is combined with heat exchange reforming (HER) arranged in series or in parallel.

Where the heat exchange reformer is included, part or all of the exit gas from the ATR is used for providing part or all of the heat required for the endothermic steam reforming taking place in the heat exchange reformer.

In case the heat exchange reforming in series is used, this means the following arrangement: part or all of the first hydrocarbon feedstock is passed to a heat exchange reformer in which steam methane reforming takes place (e.g as reaction (1)). The exit gas from the heat exchange reformer is passed to the ATR. Part or all of the exit gas from the ATR is directed to the heat exchange reformer and provides the heat for the steam reforming reaction by indirect heat exchange.

In case the heat exchange reforming in parallel is used, this means the following arrangement:
part of the first hydrocarbon feedstock is passed to the ATR. The balance of the first hydrocarbon feedstock is optionally mixed with steam and passed to the heat exchange reformer in which steam methane reforming takes place (e.g as reaction (1)). The exit gas from the heat exchange reformer is mixed with part or all of the exit gas from the ATR and passed to the other side of the heat exchange reformer to provide heat for the steam reforming by indirect heat exchange.

In another embodiment part or all of the exit gas from the ATR provides heat for the heat exchange reformer before it is mixed with the exit gas from the heat exchange reformer.

As used herein the term "raw synthesis gas" defines the synthesis gas obtained directly from the ATR or from the combination of ATR and HER.

Throughout the specification it would be understood that instead of autothermal reforming (ATR), catalytic partial oxidation (CPO) may be used.

In a particular embodiment of the invention in connection with of the above or below embodiments, stage (a) comprises only use of autothermal reforming (ATR) stage, while the primary reforming stage in step (b) is only in the form of steam methane reforming (SMR).

As used herein the term "an autothermal reforming stage (ATR)" means one or more ATR stages.

Autothermal reforming (ATR) is described widely in the art and open literature. Typically, the autothermal reformer comprises a burner, a combustion chamber, and catalyst arranged in a fixed bed all of which are contained in a refractory lined pressure shell.

Autothermal reforming is for example described in Chapter 4 in "Studies in Surface Science and Catalysis", Vol. 152 (2004) edited by Andre Steynberg and Mark Dry.

In the ATR, oxidant gas, and in some cases steam is added. Synthesis gas ("syngas"), herein referred to as "raw synthesis gas" is formed by a combination of partial oxidation and steam reforming in the autothermal reformer.

By the term "oxidant gas" is meant a stream comprising oxygen, preferably more than 75 vol %, more preferably more than 85 vol % oxygen and most preferably more than 95% oxygen. Examples of oxidant gas are oxygen, mixture of oxygen and steam, mixtures of oxygen, steam, and argon, and oxygen enriched air.

The temperature of the synthesis gas leaving the ATR is between 900 and 1100° C., or 950 and 1100° C., typically between 1000 and 1075° C. This hot effluent synthesis gas leaving the autothermal reformer comprises carbon monoxide, hydrogen, carbon dioxide, steam, residual methane, and various other components including nitrogen and argon.

As used herein the term "SMR line" means the process line in which the primary reformed gas is produced, i.e. step (b), and may also include use of other types of primary reforming such as convection reforming including heat exchange reforming. In a particular embodiment step (b) includes also reforming combining the use of radiant and convective heat transfer, i.e. a radiant-convection reformer, for instance a Topsoe Bayonet reformer (TBR)

In a steam methane reformer (SMR), also known as tubular reformer, a number of catalyst filled tubes are located in a furnace. Heat for the steam reforming reaction is provided by burners located inside the furnace for example on the furnace walls. Most or all of the heat transferred to the catalyst filled tubes is by radiation. The exit temperature of the gas leaving the catalyst filled tubes is above 800° C., often above 850° C., for instance above 900° C.

A radiation-convection reformer, e.g. TBR, combines heat transfer by radiation and convection in one reformer. In a TBR bayonet reformer tubes are located in a furnace box heated by radiant wall burners. Part of the heat required for the steam reforming reaction is provided by indirect heat exchange by the reformed gas flowing through the bayonet tubes as described above for the convective reformer.

SMR may be combined with heat exchange reforming (HER) either in series or parallel arrangement.

In case a heat exchange reformer is included, part or all of the exit gas from the steam methane reformer SMR is used for providing the heat required for the endothermic steam reforming taking place in the heat exchange reformer.

In case the heat exchange reforming in series is used, this means the following arrangement: part or all of the second hydrocarbon feedstock mixture is passed to a heat exchange reformer in which steam methane reforming takes place (e.g as reaction (1)). The exit gas from the heat exchange reformer is passed to steam methane reformer. Part or all of the exit gas from the steam methane reformer is directed to the heat exchange reformer and provides the heat for the steam reforming reaction by indirect heat exchange.

In case the heat exchange reforming in parallel is used, this means the following arrangement: part of the second hydrocarbon feedstock is passed to the steam methane reformer. The balance of the first hydrocarbon feedstock is optionally mixed with steam and passed to a heat exchange reformer in which steam methane reforming takes place (e.g as reaction (1)). The exit gas from the heat exchange reformer is mixed with part or all of the exit gas from the steam methane reformer and passed to the other side of the heat exchange reformer to provide heat for the steam reforming by indirect heat exchange.

In another parallel embodiment, the exit gas from the heat exchange reformer, i.e. reformed process, is mixed with exit gas from the steam methane reformer after the latter has delivered heat to the heat exchange reformer.

According to the invention, a portion, between 1 and 20% vol of the carbon monoxide and hydrogen in the synthesis gas has been produced in the SMR line. The amount is in each case determined such that the ratio between $H_2$ and CO in the mixed, final synthesis gas has the desired value of around between 1.7 and 2.3, preferably between 1.8 and 2.2.

At the above percentage range and despite the "addition" of an SMR line to a current ATR line, which at first glance will cause the efficiency of the plant to drop, it turns out that the efficiency becomes unexpectedly high compared to a layout in which the synthesis gas is produced only by ATR. As mentioned above, it is well known that synthesis gas production with an ATR results in a higher overall plant efficiency than if the synthesis gas production takes place in an SMR. In other words, the expected result is a decrease in efficiency as the fraction of carbon monoxide and hydrogen produced in an SMR increases from 0% (all $H_2$ plus CO produced in the ATR line, as in conventional plants in operation) to 100% (all $H_2$ plus CO produced in an SMR). However, the inventors have observed an unexpected increased efficiency at this particular range of 1-20% of the carbon monoxide and hydrogen being produced in the SMR.

As used herein the term "primary reformed gas" defines the synthesis gas obtained directly from the SMR or the combination of SMR and HER and optionally also radiant-convection reformer, e.g. TBR.

In a preferred embodiment the primary reformed gas and the raw synthesis gas are cooled before the combination in step (c) to form the synthesis gas. In another embodiment the primary reformed gas and the raw synthesis gas are cooled separately to below the (respective) dew points and the condensed phase of mainly liquid water is removed before the combination to form the synthesis gas in step (c). This enables that the cooling section be optimized individually and avoids blending of streams at high temperature, which normally impose a significant challenge in terms of process design.

As used herein the term "naphtha" or "naphtha stream" means a stream having hydrocarbons in the range of C5-C10, preferably as paraffins and olefins. More specifically, the naphtha fraction contains hydrocarbons in the C5-C10 range i.e. with IBP=30° C., 50% BP=115° C. and FBP=160° C. according to characterization by ASTM D86.

In yet another embodiment in combination with one of the above or below embodiments, tail gas is also added in step (b). In particular, this tail gas may also be used to provide heat for example for feedstock preheating, water evaporation, steam superheating, and as fuel for the SMR. A portion of the tail gas may also be flared.

In another particular embodiment in connection with one of the above or below embodiments, no further conversion or removal of the carbon monoxide in the primary reformed gas takes place before the primary reformed gas is combined with the raw synthesis gas in step (c). In this same embodiment no further conversion or removal of the carbon monoxide in the raw synthesis gas takes place before the raw synthesis gas is combined with the primary reformed gas.

In another particular embodiment in combination with one or more of the above or below embodiments, the process further comprises previous to steps (a) or (b) a step of passing the first or second hydrocarbon feedstock through a desulfurization stage.

The invention encompasses having an ATR line (step (a)) operating at low process steam-to-carbon molar ratios, S/C, and a SMR line (step (b)) operating at higher S/C. Accordingly, in yet another embodiment in combination with one or more of the above or below embodiments, the S/C in step (a) is in the range 0.4-1.0, preferably 0.4-0.8, most preferably 0.4-0.7, while the S/C in step (b) is in the range 1.5-4.0, preferably 2.0-3.5, more preferably 2.0-3.0. The steam-to-carbon molar ratio, S/C, (process steam-to-carbon molar ratio) means here the number of moles of steam divided by the number of moles of hydrocarbon carbon. The number of moles of steam includes all the steam contained in the hydrocarbon feedstock immediately upstream the ATR or SMR as the case may be, and also includes steam added via separate stream(s) directly to the ATR. The hydrocarbon carbon means the hydrocarbons present in the hydrocarbon feedstock immediately upstream the ATR or SMR as the case may be, and includes the hydrocarbon carbon from the recycled tail gas.

In a particular embodiment in connection with one of the above or below embodiments, the process steam-to-carbon molar ratio in step (a) is in the range 0.3-0.7. Preferably, the overall steam-to-carbon molar ratio in step (a) is in the range 0.3-0.7 and the ratio $R_{SMR}$ is 3-10, or 3-8%. More preferably, the overall steam-to-carbon molar ratio in step (a) is in the range 0.4-0.6 and the ratio $R_{SMR}$ is 3-7%, such as 3.5-7%. At the above ranges particular high plant efficiencies are obtained.

A major part of the hydrocarbon feedstock, e.g. natural gas, is fed to the ATR line together with so much tail gas that the $H_2/CO$ ratio in the synthesis gas produced in this unit is below the value required for the FT-synthesis, i.e. a $H_2/CO$ molar ratio of for example 1.9 or lower. The remaining minor part of the natural gas feed is fed to the SMR line, optionally together with some of the remaining tail gas from the FT-synthesis. The operating conditions in the SMR line including the S/C are selected such that the $H_2/CO$ ratio in the synthesis gas produced in this line is above the ratio required for the FT-synthesis. The amount of natural gas feed to the SMR line is adjusted so that the $H_2/CO$ ratio in the final synthesis gas obtained by mixing of the raw synthesis gas from the ATR line and the SMR line is equal to the ratio required by the FT-unit, again normally about 2.

The recycle of tail gas is however also inconvenient since it results in the carry-over of inerts such as methane, carbon dioxide and nitrogen, which may build up in the process. Thus, tail gas not used for feed is used as fuel for the reformer unit(s) of the SMR line, in particular the SMR unit, and optionally for the fired heaters in the ATR line, and/or for heaters outside the synthesis gas unit, and/or as source for making power to drive compressors and the unit for producing oxygen.

In yet another embodiment in connection with anyone of the above embodiments the process further comprises converting the synthesis gas to liquid hydrocarbons such as diesel by Fischer-Tropsch synthesis.

BRIEF DESCRIPTION OF THE FIGURES

The invention is further illustrated by reference to the attached figures, in which.

DETAILED DESCRIPTION OF THE FIGURES

Figure 1:
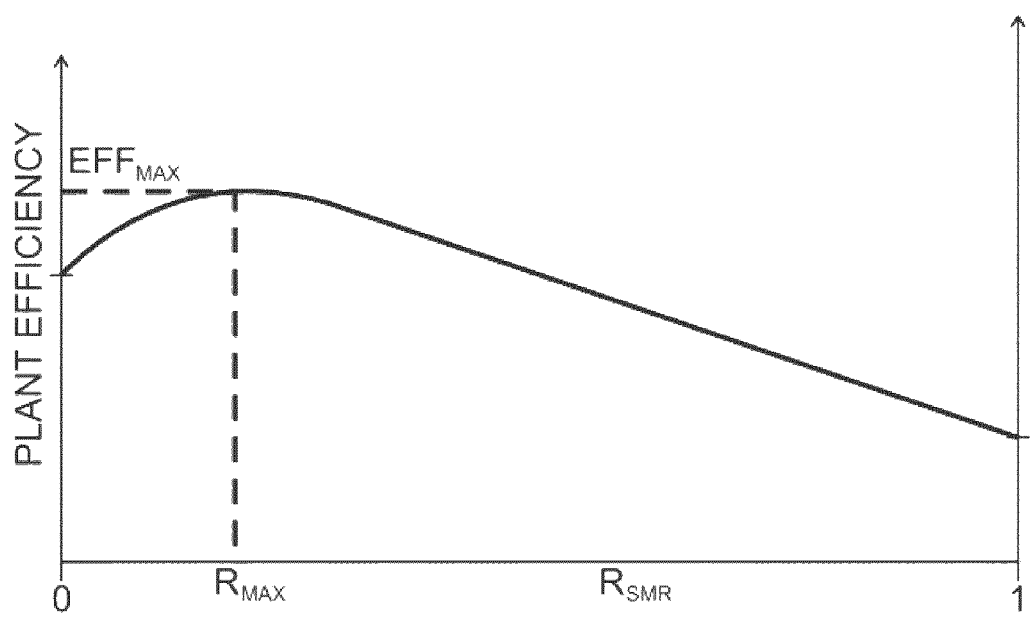
FIG. 1 shows a schematic of the surprising increase in plant efficiency.

FIG. 1 illustrates the plant efficiency as function of $R_{SMR}$. As $R_{SMR}$ is increased from zero, the plant efficiency also increases. The plant efficiency further increases with increasing values of $R_{SMR}$ up to a certain value of $R_{SMR}$ (called $R_{SMR,max}=R_{max}$) with a corresponding maximum efficiency, $Eff_{MAX}$. As the value of $R_{SMR}$ is further increased from $R_{max}$, the plant efficiency decreases to values below $Eff_{MAX}$. At $R_{SMR}=1$ corresponding to synthesis gas production by only an SMR-line, the plant efficiency is lower than for the reference case with synthesis gas production by only an ATR-line.

Figure 2:
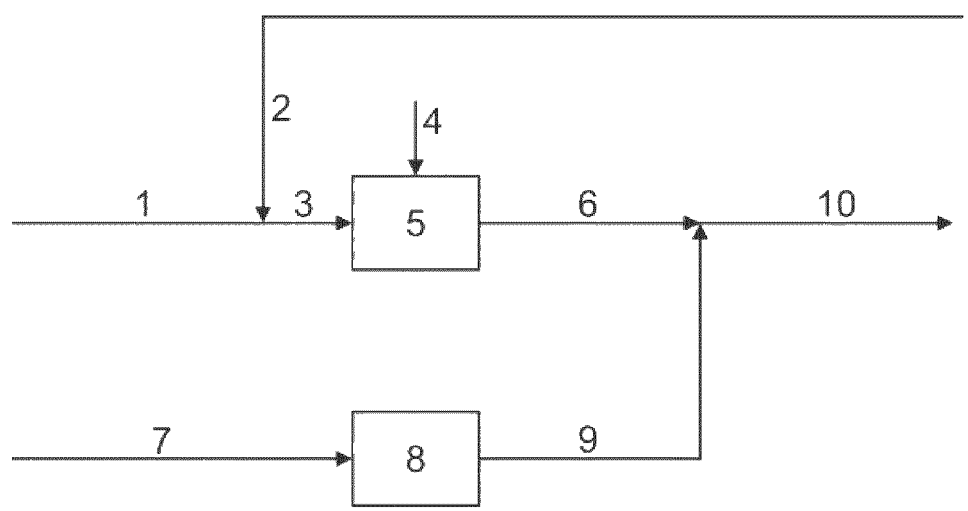
FIG. 2 shows a general embodiment of the invention in which tail gas recycle is used in the ATR line.

In FIG. 2 first hydrocarbon feedstock 1 is mixed with tail gas 2 from the F-T synthesis to form mixture 3. The mixture 3 is sent into the ATR 5 and reacted together with oxygen 4 into raw synthesis gas 6 that exits the ATR. In parallel with the ATR train is the second hydrocarbon feedstock 7 which is sent into a SMR 8 and reacted into primary reformed gas 9. Streams 6 and 9 are mixed into a synthesis gas (10) that is sent to F-T synthesis.

Figure 3:
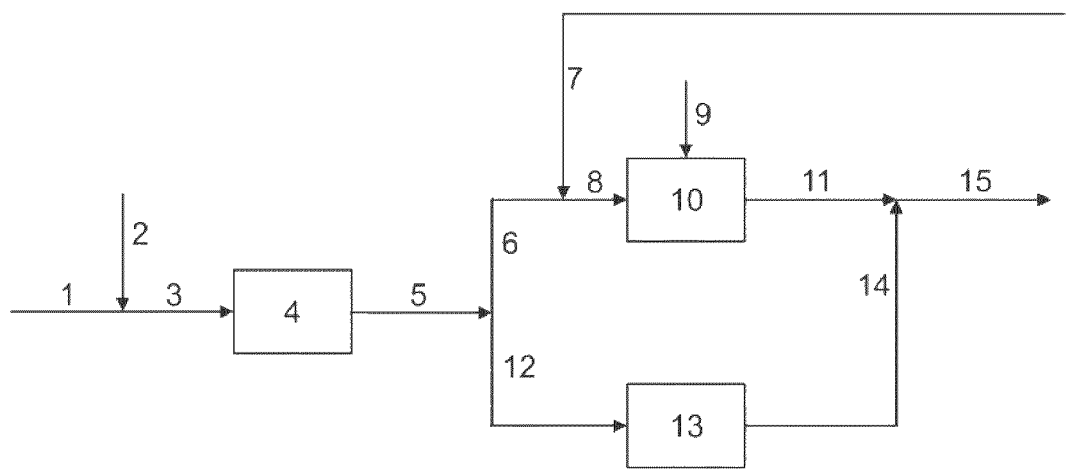
FIG. 3 shows a specific embodiment of the invention in which the first and second hydrocarbon feedstock streams are split from a single hydrocarbon feedstock which is subjected to pre-reforming.

In FIG. 3 hydrocarbon feedstock 1 is mixed with steam 2 to form stream 3 before it is sent into a pre-reformer 4. The pre-reformed gas 5 is split into a first hydrocarbon feedstock 6 and a second hydrocarbon feedstock 12. The first hydrocarbon feedstock 6 is mixed with tail gas 7 from the F-T synthesis into 8 before it is sent into the ATR 10. In the ATR 10, the mixture 8 is reacting with the added oxygen 9 into raw synthesis gas 11. The second hydrocarbon feedstock 12 is sent to a SMR 13 and reacts into a primary reformed gas 14. The raw synthesis gas 11 is mixed with the primary reformed gas 14 into a synthesis gas 15 which is sent to F-T synthesis.

Example

Calculations were made to simulate the operation of a complete GTL facility including synthesis gas production according to the invention and Fischer-Tropsch (FT) synthesis in a cooled reactor according to process scheme as described by Landoli and Kjelstrup (Energy & Fuels 2007, 21, 2317-2324). The calculation model includes recycle of unconverted synthesis gas (tail gas) to the FT reactor as internal recycle and to the synthesis gas production as external recycle. The FT reactor is simulated as a series of three converters. The first converter converts synthesis gas to a product of linear, saturated hydrocarbons assuming the Anderson-Schulz-Flory distribution with an alpha-value (chain growth probability) of 0.94. Hydrocarbons with up to 52 C-atoms are considered. The second converter converts part of the saturated hydrocarbons to olefins, and the third converter converts part of the olefins to oxygenates. The conversions to olefins and oxygenates are adjusted to approximately match compositions given in the open literature, e.g. by Dieter Leckel, Upgrading of Fischer-Tropsch Products to produce Diesel, in Haldor Topsoe Catalysis Forum, Munkerupgaard, 19-20 Aug. 2010. The per pass conversion of $H_2$ in the FT reactor is specified to be approximately 60% and the internal recycle of tail gas is adjusted to obtain an overall conversion of $H_2$ in the FT synthesis loop of 90%. The external recycle of tail gas is adjusted to obtain a $H_2$/CO molar ratio in the synthesis gas of 2.0. Excess tail gas is used as fuel for the burners in the SMR and in the fired heaters heating process streams in the ATR line to the required temperatures and superheating steam from the waste heat boilers downstream the ATR and the SMR. Remaining tail gas after this is flared. All components with more than 2 carbon atoms are considered to be products (wax, diesel naphtha, and LPG) and are assumed to be recovered with 100% efficiency.

In concordance with the definition of the present invention, the plant efficiency is calculated as carbon in FT-product divided by the carbon in the hydrocarbon feedstock. The hydrocarbon feedstock is natural gas. Natural gas consumed in the plant as fuel is not included.

The superheated steam from the waste heat boiler downstream the ATR and the SMR and the saturated steam from the FT-reactor are assumed to be expanded for power production (after extraction of steam required for process purposes) with typical efficiencies. The consumption of power for the process including the power required for production of oxygen for the ATR in the Air Separation Unit (ASU) is included in the calculation of power import/export. In all examples cases below, the power produced exceeds the power consumed by the process. The excess power is considered of no value.

The conditions in the ATR are assumed to be process steam to carbon molar ratio (S/C) equal to 0.40 or 0.60 and the exit temperature 1025° C. The SMR in the parallel line operates at S/C ratio of 3.0 and an exit temperature of 870° C. The feed for the SMR is natural gas. The product gases from ATR and the SMR are cooled, and condensate is separated, before the two streams are mixed and used as feed for the FT synthesis unit. Carbon dioxide is removed to 1 vol % from the product gas from the SMR line before combining with the exit gas from the ATR. The pressure in each of the two synthesis gas production lines is adjusted to obtain a pressure at inlet FT-synthesis reactor of 30 bar g.

Overall S/C in the ATR Line 0.60:
($R_{SMR}$ %, Plant efficiency %)=(0, 76.75), (3.49, 78.81), (6.23, 78.79), (11.43, 78.72), (15.62, 78.56)

Overall S/C in the ATR Line 0.40:
($R_{SMR}$ %, Plant efficiency %)=(0, 74.28), (6.82, 79.70), (10.17, 79.65), (13.34, 79.32), (14.76, 79.23)

It is observed that, for both values of the overall steam to carbon ratio, the plant efficiency increases significantly when introducing synthesis gas production in an SMR-line. When the capacity of the SMR line increases, the plant efficiency reaches a maximum value. However, when the capacity of the SMR line is further increased beyond the point leading to the maximum efficiency, the efficiency slowly decreases. This behavior of the system is both surprising and counterintuitive. The differences in plant efficiency values are highly significant, not least when considering daily productions in order of 10000 barrels of product per day.

The invention claimed is:

1. A process for the production of synthesis gas comprising:
    (a) passing a first hydrocarbon feedstock, a tail gas from a Fischer-Tropsch (FT) synthesis stage, and an oxidant gas to an autothermal reforming (ATR) stage or catalytic partial oxidation (CPO) stage to form a raw synthesis gas;
    (b) passing a second hydrocarbon feedstock through a primary reforming stage in the form of steam methane reforming (SMR), to form a primary reformed gas;
    (c) combining part or all of the primary reformed gas of step (b) with the raw synthesis gas of step (a) to form a synthesis gas according to a $R_{SMR}$ ratio between 1 and 20%, where $R_{SMR}$ is defined as the volumetric flow rate of carbon monoxide and hydrogen in the primary reformed gas to the volumetric flow rate of the hydrogen and carbon monoxide in the synthesis gas.

2. The process according to claim 1 in which said first hydrocarbon feedstock and said second hydrocarbon feedstock are split from a single hydrocarbon feedstock and wherein prior to split the single hydrocarbon feedstock is subjected to pre-reforming.

3. The process according to claim 1 wherein naphtha formed or synthesised in the FT-synthesis stage is not added to the first hydrocarbon feedstock or the second hydrocarbon feedstock or to the single hydrocarbon feedstock.

4. The process according to claim 1 wherein each individual stream in the form of first hydrocarbon feedstock, or second hydrocarbon feedstock, or both, are subjected to pre-reforming prior to passing through autothermal reforming stage or primary reforming stage.

5. The process according to claim 1 further comprising subjecting primary reformed gas to the sequential stages of water gas shifting, separating a hydrogen-rich stream in a separation means, and mixing all or a portion of the hydrogen-rich stream with the produced synthesis gas of step (c).

6. The process according to claim 1 wherein the produced synthesis gas of step (c) has a molar ratio of hydrogen to carbon monoxide of 1.7-2.3.

7. The process according to claim 1 wherein in step (a) the autothermal reforming (ATR) stage is combined with heat exchange reforming (HER) arranged in series or in parallel.

8. The process according to claim 1 wherein the process further comprises previous to steps (a) or (b) a step of passing the first or second hydrocarbon feedstock through a desulfurization stage.

9. The process according to claim 1 wherein the process steam-to-carbon molar ratio (S/C) in step (a) is in the range 0.4-1.0, while the process steam-to-carbon molar ratio in step (b) is in the range 1.5-4.0.

10. The process according to claim 1 wherein the process further comprises subjecting primary reformed gas to the sequential stages of water gas shifting, separating a hydrogen-rich stream in a separation means, and mixing all or a portion of the hydrogen-rich stream with the raw synthesis gas of step (a).

11. The process according to claim 1 wherein the process further comprises converting the synthesis gas to liquid hydrocarbons by Fischer-Tropsch synthesis.

\* \* \* \* \*